Sept. 1, 1970 J. R. FLOWER 3,526,321
DISPOSABLE ARTIFICIAL KIDNEY
Filed Oct. 10, 1967 4 Sheets-Sheet 3

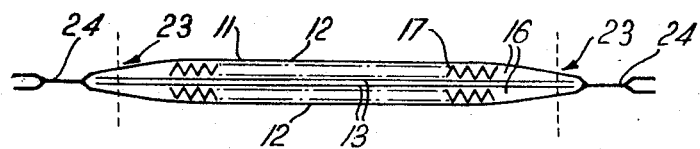
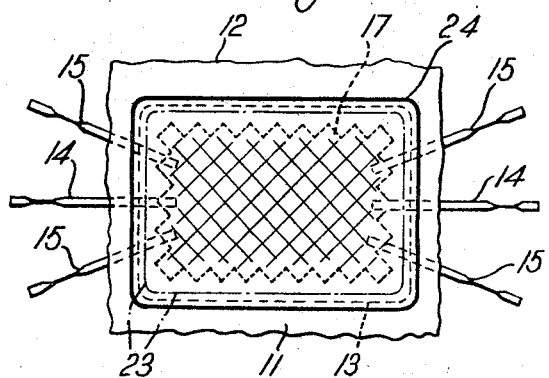
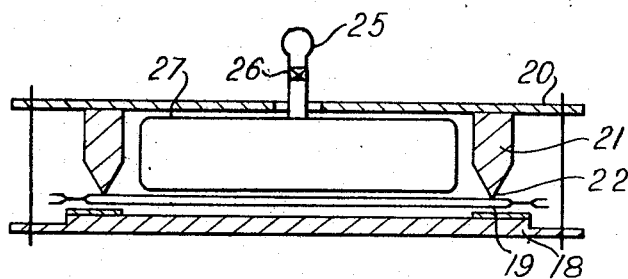

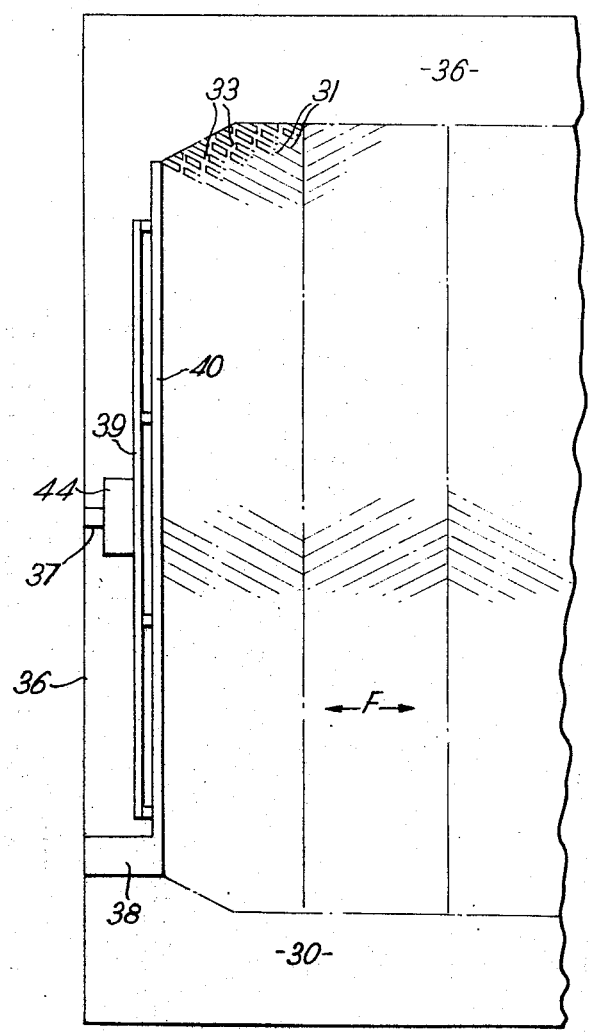

Inventor
John Richard Flower

By Cushman, Darby & Cushman
Attorneys

United States Patent Office 3,526,321
Patented Sept. 1, 1970

3,526,321
DISPOSABLE ARTIFICIAL KIDNEY
John Richard Flower, Leeds, England, assignor to National Research Development Corporation, London, England, a British corporation
Filed Oct. 10, 1967, Ser. No. 674,276
Claims priority, application Great Britain, Oct. 10, 1966, 45,258/66
Int. Cl. B01d 13/00, 31/00
U.S. Cl. 210—321                                 18 Claims

ABSTRACT OF THE DISCLOSURE

A disposable haemodialysis pack comprising four flexible sheets laid in a stack and sealed together around their edges, the inner two sheets constituting dialysis membranes and the outer two sheets being impermeable, with inlet and outlet connections for blood communicating with the center chamber formed between the two inner sheets; and inlet and outlet connections for dialysis fluid communicating with the two chambers formed between the inner and outer sheets. A pattern of projections is moulded onto the inner surface of each outer sheet to serve as spacing means between the inner and outer sheets, and also to limit separation of the two inner sheets from one another.

---

Figure 5:
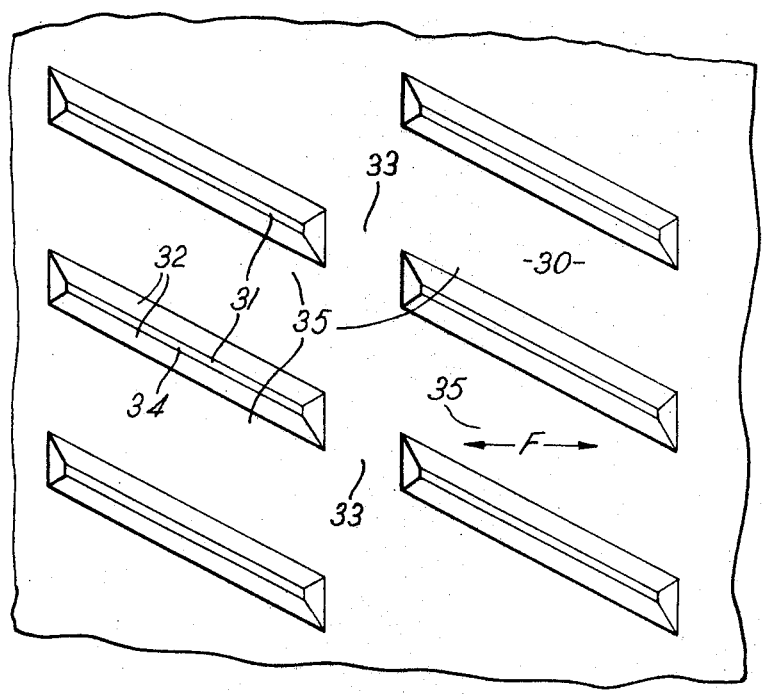

This invention relates to dialysers, more particularly for use in artificial kidney machines.

During haemodialysis of a patient suffering from renal failure blood is withdrawn from one blood vessel, usually an artery, and subsequently returned into another blood vessel, usually a vein, after passage through the dialyser which comprises, in essence, an arrangement of flow ducts for blood and dialysis fluid, respectively, on opposite sides of a dialysis membrane. The dialysis fluid, which may be a dilute aqueous solution based on tap water, flows from a source of supply through the appropriate dialyser ducts and then to waste or to a regeneration unit. The usual dialysis membrane employed is regenerated cellulose.

Although it is possible to pump the blood through the dialyser by means of a peristaltic pump, the preferred machine has a pressure drop through the blood flow passages that is low enough for the patient's heart to be able to supply the necessary pumping action, rendering an external pump unnecessary. In one well-known form of dialyser, two co-operating blocks of polypropylene plastic are secured to one another and have matching cavities in their mating faces such that enclosed chambers for dialysis are formed between the two blocks. Two contiguous sheets of regenerated cellulose are clamped between the two blocks so that they form membranes partitioning the dialysis chambers. Blood flow takes place between the two regenerated cellulose membranes, which are caused to bulge away from one another when the blood enters, while the dialysis fluid is supplied to the two spaces bounded by the membranes and the walls of the cavities in the polypropylene blocks. In order to restrict the extent to which the membranes can bulge away from one another, and thereby limit the width of the blood flow passage and create the desired passages outside the membranes for dialysis fluid, the cavity walls of the polypropylene blocks are formed with a large number of comparatively closely-spaced longitudinal ridges. The bulging of the membranes is therefore checked when they encounter the tops of these ridges.

A major disadvantage of this form of dialyser is the fact that, after a dialysis, it requires considerable labour on the part of a skilled technician before the machine can be ready for use again. While the dialysis membranes are disposed of and replaced by fresh ones, so that the blood flow passages are, in fact, renewed and do not have to be cleaned, there remains the arduous task of cleaning and often sterilising the polypropylene blocks. Moreover, this cleaning of the machine carries with it a risk of exposure of the technician to infection. After new membranes have been inserted and clamped between the blocks the entire assembly is often pressure tested and finally sterilised by liquid means, necessitating removal of the disinfectant by repeated washings with sterile saline solution. It is an object of the invention to improve haemodialysis machines in these and other respects.

According to the present invention, the passages for both blood flow and flow of dialysis fluids are provided within a disposable substantially flat pack comprising two inner sheets constituting dialysis membranes, e.g. regenerated cellulose, and two outer sheets of impermeable material, which could be flexible polyvinyl chloride, the arrangements being such that open flow passages are maintained between each inner sheet and the adjacent outer sheet.

The open flow passages may be created by the inclusion of spacer means between the inner and outer sheets, which spacer means may take the form of separate spacer elements of semi-rigid openwork character inserted between the sheets or may be moulded integrally with the inner or outer sheets if these are of suitable material. However, in the preferred embodiment each outer sheet is embossed with a pattern of outwardly-directed projections such that the inside surface has a corresponding pattern of intercommunicating recesses or channels to provide the dialysis fluid flow passages.

Since all flow now takes place within this disposable pack, the cleaning problem is overcome and indeed since the surfaces of the blocks or plates between which the dialysis chambers are formed are no longer themselves contacted by either fluid the blocks need not be of a special material but can, if desired, be metal plates. Such a construction results in a general easing of the difficulties, hazards and cost attending the operation and maintenance of this type of machine.

Figure 6:
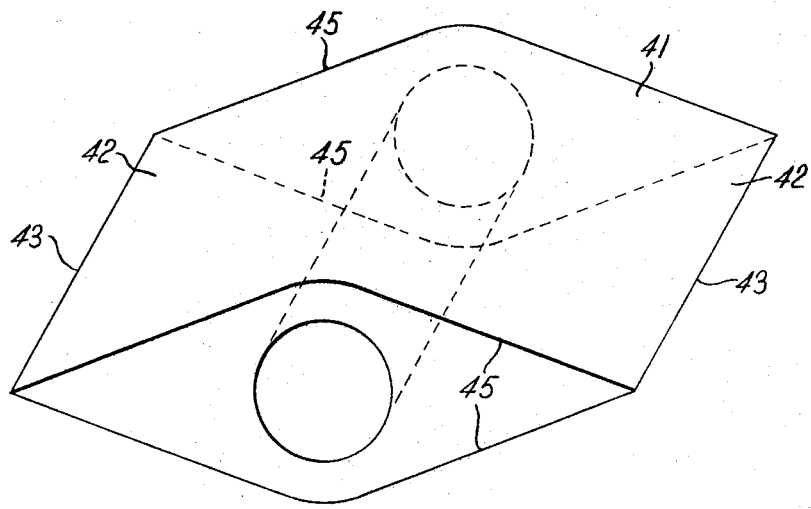
Figure 7:
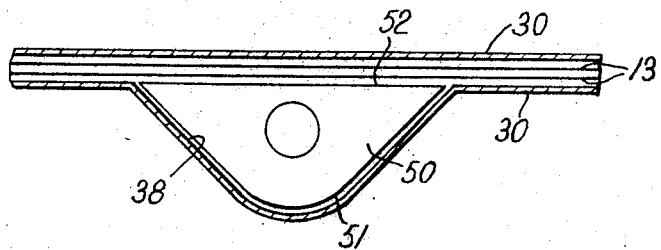

The nature of the improvement will now be described in more detail with reference to specific examples illustrated in the accompanying diagrammatic drawings. In the drawings:

FIG. 1 is a diagrammatic cross section through a disposable pack according to the invention, FIG. 2 shows the pack in plan view, FIG. 3 is a diagrammatic cross section through the frame of a dialysis machine incorporating such a pack, FIG. 4 shows in plan a moulded sheet of plastics material two of which can form the outer sheets of a pack according to the invention, FIG. 5 shows part of the sheet of FIG. 4 to a larger scale and in more detail, FIG. 6 shows in pictorial view a blood port for use in a pack comprising outer sheets as in FIG. 4, and FIG. 7 shows the arrangement of a port for dialysis fluid.

FIGS. 1 and 2 illustrate the principle of a disposable dialyser pack according to the invention. The pack comprises an essentially flat flexible impermeable sealed envelope 11 between the principal walls 12 of which are provided two partitioning sheets 13 of semipermeable material, e.g. regenerated cellulose. The envelope is substantially rectangular in plan and is fitted within a rectangular cavity formed by clamping together two blocks or frame members (not shown) having mating rectangular recesses in their contiguous surfaces. Appropriate connections 14 are made to the space between the two inner semi-permeable membranes 13 for the inflow and the outflow of blood; further connections 15 are made to the spaces 16 in the envelope outside the membranes 13, that is between the membranes 13 and the walls 12, for the inflow and outflow of dialysis fluid. The spaces 16 also contain semi-rigid openwork spacer elements 17 on either side of the pair of membranes 13 to limit the extent to which the membranes 13 can be forced apart by the blood flow between them and thereby determine the width of the blood flow passage which is quite critical.

In the simplest form, the outer walls 12 of the disposable pack may be directly in contact with the rigid walls of the cavity in the dialyser frame. Preferably, the cavity in the frame is so dimensioned that the margins of the pack are gripped all round between the two frame members, in the regions indicated at 23, whereby the various spaces in the pack are hermetically sealed from each other. It is therefore not necessary to effect a perfect seal between the internal membranes 13 and the walls 12 of the disposable pack during manufacture, and indeed this might be difficult, but it is sufficient to affix the sheet margins to one another well enough to keep them in correct assembly in the pack until such time as the pack is clamped within a dialyser frame for use. This can be accomplished by means of a medically approved adhesive; since the holding power of the adhesive is not required once the pack is in place in the dialyser frame, a water soluble adhesive could be used so long as it is medically compatible in the situation under consideration. However, in the case illustrated the outer envelope of the disposable pack is of a synthetic plastic material, such as plasticized polyvinyl chloride, which is chemically bonded or heat-sealed hermetically around the margins as indicated at 24 and this makes it practicable to presterilize the interior of the pack during manufacture. In addition, the connections 14 for the blood, and the connections 15 for the dialysis fluid, can be bonded within the envelope prior to sterilization.

Instead of both the outer walls of the disposable pack being in direct contact with the internal surfaces of the dialyser frame, at least one of the pack walls may be backed by a cushion applying a uniform pressure to the pack. One such arrangement is shown in FIG. 3, in which the dialyser frame comprises a base plate 18, on which the disposable pack 19 is laid, and a head 20 formed with a seal ring 21 of rectangular plan form which has a narrow edge 22 for clamping the margins of the pack 19 on to the base plate. Within the seal ring 21 there lies an inflatable air cushion 27 for applying a selected uniform pressure to the upper wall of the pack. The air cushion is inflatable to the desired pressure by a squeeze bulb 25 via a non-return valve 26. Or instead of an air cushion a resilient blanket formed from, for instance, foam rubber or foam plastic can be employed.

Employment of a disposable pack as described gives numerous advantages. Since the fluids never contact the dialyser frame no special cleaning and sterilizing of the frame is necessary and the frame members need not be of a specially selected material but can be of any suitably rigid material, in particular metal. A convenient arrangement comprises two metal frame members connected by quick release clamping toggles. The disposable part of the machine, consisting of a plastic bag, two sheets of regenerated cellulose and two plastic spacer elements, can be very cheap. Whereas the machine functions, from the clinical standpoint, in essentially the same way as existing dialysers, the operation and maintenance is much simplified; the presterilized disposable pack is considerably easier to fit into the dialyser frame than the separate regenerated cellulose sheets hitherto employed, and the stringent medical requirements arising from the dialysis fluid being in contact with the frame no longer apply. The dimensions of the flow areas can be closely controlled, with better reproducibility of machine performance, and presterilizing makes the dialysis operation safer.

The spacers in the dialysis fluid passages need not be separate elements but they may be formed as projections or ridges moulded on the internal faces of the outer walls of the pack or they could be on the external faces of the contiguous membranes if the latter were made of a suitable material.

The preferred arrangement, however, is illustrated in FIG. 4 which shows one of two identical sheets prepared for use as the two outer sheets of the pack. This sheet 30 is vacuum moulded from sheet plastic material about .01" thick so as to have an embossed pattern of ridges arranged in herringbone form. The general direction of flow through the pack is indicated by the arrow F. The longitudinal axes of the ridges 31 are set at an inclination of 1 in 2 and the inclination reverses at intervals of about 2" along the pattern to produce the herringbone formation. The consecutive ridges are spaced apart at a distance of .125", considered perpendicular to the general direction of flow. Each ridge has tapering side walls 32, making an angle of 15° to a plane normal to the plane of the sheet, and internally its dimensions are .05" in height and .005" across at the peak 34, the last dimension again being measured perpendicular to the general direction of flow. Each ridge is interrupted, at intervals of 0.25" along the sheet, by gaps 33 which are approximately 0.06" across at the ridge peak measured parallel to the general direction of flow. Although the term "ridges" has been employed the ridges are not formed to project out from the plane of the unembossed sheet but instead all the immediately surrounding portions 35 of the sheet are recessed, i.e. caused to project at the opposite side of the sheet, so that the result is a pattern of "ridges" 31 set in a large shallow well and having their peaks 34 lying in the same plane as the unembossed surround 36 of the sheet.

By this means there is created, between and around the ridges 31, a system of intercommunicating passages or channels. It will be understood that when two such identical sheets are placed together with their ridge patterns opposed face to face, the ridges on one are everywhere oppositely inclined to and crossing those on the other. The dimensions are primarily chosen such that, even if lateral misalignment of the two outer sheets with respect to one another should occur, there is no risk of a ridge on one entering a depression of the opposite sheet and thus possibly damaging the intervening membranes. In the particular example given, when the two sheets are assembled for use in correct alignment, each ridge segment on one sheet is pressing, through the interposed membranes, on two intersecting ridge segments of the opposite sheet, which gives the added advantage of halving the deforming force at each intersection at a given overall clamping pressure as compared with only one intersection per ridge segment. Two intersections are not essential, however.

It is important that the outer sheets should be sufficiently flexible that even if the peaks of the ridges are not naturally all in quite the same plane, perhaps due to surface distortion, every ridge can still press against ridges of the opposite sheet when the flat pack is assembled for use. This degree of flexibility is what is meant by the expression "semi-rigid" as used elsewhere in this specification.

FIG. 4 also shows the outer sheet to be moulded with passages for the entry and exit of blood and dialysis fluid. There are two blood passages 37 half-way along each end and two recesses 38 for dialysis fluid ports at diagonally opposed corners of the herringbone pattern. The passages 37 communicate with lateral distribution channels 39 and the recesses 38 with distribution channels 40. The connecting tubes for blood and dialysis fluid, including air bubble and clot removal means and any similar devices, may be preconnected to the disposable pack during manufacture prior to overall sterilization.

Since the blood flow has to enter and leave from between the inner membranes of the pack, suitable ports are needed for this purpose.

FIG. 6 shows such a blood port 41 which can be moulded in silicone rubber and which has outer surfaces forming two laterally projecting fins 42 each tapering to a sharp edge 43. Recesses 44 of corresponding shape are moulded in the blood passages 37 of the two outer sheets 30 of the pack to receive these ports. The two inner membranes have their margins lying, respectively, one above and one below each blood port 41, that is to say they are trapped between the outer surfaces of the port and the two outer sheets 30, and the tapering fins of the port enable the two membranes to pass out of the lateral extremities of the port cavities and come together without any sharp creasing. The end edges 45 of the blood port 41 are each formed with a radius which is also to avoid sharp creasing of the membranes.

FIG. 7 shows the arrangement of a port for dialysis fluid. Each port 50 can be of elastomeric material and is inserted into one of the recesses 38. It is humped at one side 51 to fit the floor of the recess while the other side 52, which lies against the adjacent dialysis membranes is flat and flush with the surrounding inner surface of the sheet 30.

When a pack having outer sheets as in FIGS. 4 and 5 is employed in the arrangement of FIG. 3, a thin rigid metal plate may be inserted between the cushion 27 and the pack, this plate having either a flat or substantially flat surface or a surface of a shape matching the projections and recesses of the contiguous outer sheet of the pack, so as to distribute the pressure evenly. The plan area of the pattern in the outer sheet of the pack must be entirely covered by the thin rigid plate, to allow for the fact that the inflated cushion adopts an approximately parallelepiped shape with radiused edges. However, while it is desirable that the rigid plate should match as nearly as possible to the contiguous outer sheet of the pack, it is not necessary for the pack sheet pattern to be reproduced in the plate since the pack sheet pattern projections may themselves be sufficiently rigid to convey a clamping pressure exerted at the bottoms of the flow channels to the intersections at the peaks of the ridges without significant change in shape.

It will be understood that many further modifications of the arrangements described are possible without departing from the scope of the invention. One dialyser frame could accommodate a number of disposable packs, with external interconnections, to achieve a desired area for dialysis. Multilayer disposable packs are possible with several parallel blood flow passages and intervening passages for dialysis fluid. It is not necessary for the pack envelopes to be rectangular; they could be circular or any other desired configuration that does not give rise to too high a pressure drop through the blood passage.

If new semi-permeable membrane materials are developed to replace regenerated cellulose they can be readily employed in disposable packs according to the invention so long as they are available in flexible sheet form.

What is claimed is:

1. A pre-fabricated disposable substantially flat pack for haemodialysis comprising a multi-layer stack of four sheets secured to one another adjacent said sheets edges forming three inter-sheet chambers of which a center chamber formed by the inner two said sheets provides a blood passage, while said outer two chambers, each of which is formed by an inner sheet and adjacent outer sheet, provide passages for dialysis fluid;

said inner two sheets being flexible dialysis membranes;
said outer two sheets being semi-rigid and impermeable synthetic plastics material having marginal regions around their peripheries which are mutually in contiguity and permanently bonded to one another in a fluid-tight manner so that said outer two sheets together form an impermeable fluid-tight permanently sealed plastic bag containing said dialysis membranes;
spacer means extending from each of said outer sheets to each of said inner sheets adjacent thereto, said spacer means maintaining open flow passages between each inner sheet and each adjacent outer sheet, said spacer means also limiting the extent to which said inner two sheets can move away from one another when blood flows between them;
blood inlet and outlet connections communicating through peripheral regions of said sealed plastic bag with said blood passage formed by said two inner sheets; and
inlet and outlet connections for dialysis fluid communicating through peripheral regions of said sealed plastic bag with said passages for dialysis fluid formed by said inner sheets and adjacent outer sheets.

2. A pack according to claim 1 wherein said spacing means comprises spacer elements of semi-rigid openwork character inserted between each dialysis membrane and the adjacent outer sheet to create said open flow passages.

3. A pack according to claim 1, wherein the inner membranes are held in place between the outer sheets by means of a medically compatible adhesive.

4. A disposable substantially flat pack for dialysis as claimed in claim 1 wherein said flexible dialysis membranes are comprised of regenerated cellulose.

5. A pack according to claim 1, wherein the outer sheets are moulded or embossed with a pattern of projections and recesses serving as said spacer means and creating said open flow passages.

6. A pack according to claim 5, wherein the outer sheets have unpatterned margins and passages for the entry and exit of blood and dialysis fluid are moulded in these margins.

7. A pack according to claim 6 complete with flow tubes for blood and dialysis fluid secured into said moulded entry and exit passages.

8. A pack according to claim 7, wherein means for air bubble and clot removal are associated with said blood flow tubes as part of the disposable pack.

9. A dialysis machine comprising two permanent separable frame members cooperating with one another to enclose a cavity for receiving a dialysis pack, and a disposable pack according to claim 5 clamped between the frame members so as to occupy said cavity wholly or partly.

10. A machine according to claim 9, wherein the margins of the pack are gripped between the frame members with a sealing pressure at a peripheral location inward of the edges of the inner membranes.

11. A machine according to claim 9, wherein the outer sheets of the pack are both contiguous with opposite walls of the cavity enclosed by the frame members.

12. A machine according to claim 9, wherein the pack has only one outer sheet contiguous with a wall of the cavity enclosed by the frame members, the opposite outer sheet being pressed upon by a pressure cushion contained within the cavity at that side.

13. A machine according to claim 12, wherein the pressure cushion is inflatable to the desired pressure.

14. A machine according to claim 12, wherein a rigid metal plate is interposed between the pressure cushion and the pack which plate is substantially flat or formed with a pattern matching that of the outer sheet of the pack with which it is contiguous.

15. A disposable substantially flat pack for haemodialysis, comprising a multilayer stack of four sheets secured to one another around their edges, forming three inter-sheet chambers of which one chamber formed by the inner two sheets provides a blood passage while the outer two chambers, each of which is formed by an inner sheet and adjacent outer sheet provide passages for dialysis fluid;

said inner two sheets being flexible dialysis membranes, of regenerated cellulose;
said two outer sheets being of impermeable material and identically molded with a herringbone pattern of interrupted ridges and recesses so that when said sheets are placed together with their inner faces opposed, the inclined ridge lines of one pattern are everywhere in crossing relationship with the corresponding ridge lines of the other sheet pattern; said ridges on said outer sheets serving as spacer means maintaining open flow passages between each inner sheet and adjacent outer sheet, said spacer means also limiting the extent to which said inner two sheets can move away from one another when blood flows between them;

blood inlet and outlet connections communicating with said blood passage between said two inner sheets; and inlet and outlet connections for dialysis fluid communicating with said passages for dialysis fluid between said inner and adjacent outer sheets.

16. A pack according to claim 15 wherein the dimensions and spacing of the pattern elements are so chosen that when the two outer sheets are placed with their inner faces together relative sliding of one sheet over the other will not discover a relative position where any ridge on one sheet will enter any recess in the other.

17. A disposable substantially flat pack for haemodialysis, comprising a multilayer stack of four sheets secured to one another around their edges, forming three inter-sheet chambers of which one chamber formed by the inner two sheets provides a blood passage while said outer two chambers, each of which is formed by an inner sheet and adjacent outer sheet provide passages for dialysis fluid;

said inner two sheets being flexible dialysis membranes, of regenerated cellulose;

said two outer sheets being of impermeable material and moulded with a pattern of projections and recesses, said projections serving as spacer means maintaining open flow passages between each inner sheet and said adjacent outer sheet, said spacer means also limiting the extent to which said inner two sheets can move away from one another when blood flows between them;

inlet and outlet connections for dialysis fluid communicating with said passages for dialysis fluid between said inner and said adjacent outer sheets; and blood port members in which the blood flow enters and leaves from between said two inner membrane sheets, each such port member consisting of a short tube of elastomeric material having a pair of laterally projecting tapering fins and fitting into correspondingly shaped recesses in said molded outer sheets so that the margins of said two inner membranes sheets, which lie one on either side of each port member between the surfaces thereof and the recessed surfaces of the outer sheets, can leave said recesses without undergoing abrupt creasing.

18. A disposable substantially flat pack for haemodialysis, comprising a multilayer stack of four sheets secured to one another around their edges, forming three inter-sheet chambers of which one chamber formed by the inner two sheets provides a blood passage while said outer two chambers, each of which is formed by an inner sheet and adjacent outer sheet provide passages for dialysis fluid;

said inner two sheets being flexible dialysis membranes of regenerated cellulose;

said two outer sheets being of impermeable material and moulded with a pattern of projections and recesses, said projections serving as spacer means maintaining open flow passages between each inner sheet and said adjacent outer sheet, said spacer means also limiting the extent to which said inner two sheets can move away from one another when blood flows between them;

blood inlet and outlet connections communicating with said blood passage between said two inner sheets; and port members of elastomeric material in which the dialysis fluid flow enters and leaves from between each said outer sheet and said adjacent inner membrane sheet, each said port member having one surface shaped to fit into a corresponding recess molded in one of said outer sheets and an opposite flat surface against which the adjacent inner membrane sheet lies.

References Cited

UNITED STATES PATENTS

| | | | |
|---|---|---|---|
| 718,358 | 1/1903 | Kneuper | 210—356 |
| 2,664,395 | 12/1953 | Marchand | 210—321 |
| 3,276,589 | 10/1966 | Jankay | 210—321 X |
| 3,342,328 | 9/1967 | Swenson | 210—321 X |
| 3,388,803 | 6/1968 | Scott | 210—321 |
| 3,406,826 | 10/1968 | Willock | 210—321 X |
| 3,411,630 | 11/1968 | Alwall et al. | 210—321 |

FOREIGN PATENTS 42,144  3/1933  France.

OTHER REFERENCES

Brown et al.: "A Simple Expendable Blood Oxygen-Gas Exchanger for Use in Open Cardiac Surgery," from Surgery, vol. 1, July 1956, pp. 100–106, 111 and 112 relied on.

Day et al.: "Combination Membrane Oxygenator-Dialyzer," from Trans. Amer. Soc. Artif. Int. Organs, 1964, pp. 69–73 relied on.

Shinaberger et al.: "Further Development and Clinical Evaluation of the Klung Dialyzer," from Trans. Amer. Soc. Artif. Int. Organs, vol. XII, published June 10, 1966, pp. 363–367 relied on.

Someren et al.: "A Simple, No-Prime Pumpless Artificial Kidney: A Preliminary Report,'" from Trans. Amer. Soc. Artif. Int. Organs, vol. IX, published June 1, 1963, pp. 73–78 relied on.

REUBEN FRIEDMAN, Primary Examiner

F. A. SPEAR, JR., Assistant Examiner